(12) United States Patent
Draluk et al.

(10) Patent No.: US 9,256,715 B2
(45) Date of Patent: Feb. 9, 2016

(54) AUTHENTICATION USING PHYSICAL INTERACTION CHARACTERISTICS

(75) Inventors: Vadim Draluk, Cupertino, CA (US); Francois Goldfain, Sunnyvale, CA (US); Avery Audrey Kwan, Oakland, CA (US); Jan-Willem Maarse, Palo Alto, CA (US)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 13/415,930

(22) Filed: Mar. 9, 2012

(65) Prior Publication Data

US 2013/0239206 A1 Sep. 12, 2013

(51) Int. Cl.
*G06F 21/31* (2013.01)
*G06F 21/00* (2013.01)
*G06F 21/32* (2013.01)

(52) U.S. Cl.
CPC ............. *G06F 21/00* (2013.01); *G06F 21/31* (2013.01); *G06F 21/32* (2013.01)

(58) Field of Classification Search
CPC ... H04L 63/102; H04W 12/08; G06F 21/316; G06F 21/32
USPC .............................................. 726/16, 17, 19
See application file for complete search history.

(56) References Cited

U.S. PATENT DOCUMENTS

| | | | |
|---|---|---|---|
| 8,312,157 B2* | 11/2012 | Jakobsson | G06F 21/316 705/51 |
| 8,447,272 B2* | 5/2013 | Faith | G06Q 30/0201 455/410 |
| 8,800,056 B2* | 8/2014 | Chow | G06F 21/316 705/64 |
| 2004/0100362 A1* | 5/2004 | Mohamed et al. | 340/5.82 |
| 2007/0250920 A1* | 10/2007 | Lindsay | 726/7 |
| 2008/0092245 A1* | 4/2008 | Alward et al. | 726/28 |
| 2009/0232368 A1* | 9/2009 | Niinuma et al. | 382/124 |
| 2009/0313693 A1* | 12/2009 | Rogers | 726/21 |
| 2010/0133338 A1* | 6/2010 | Brown et al. | 235/382 |
| 2011/0016534 A1* | 1/2011 | Jakobsson et al. | 726/28 |
| 2011/0159850 A1* | 6/2011 | Faith | G06Q 30/0201 455/411 |
| 2012/0137340 A1* | 5/2012 | Jakobsson | G06F 21/316 726/1 |
| 2013/0042327 A1* | 2/2013 | Chow | G06F 21/316 726/28 |

OTHER PUBLICATIONS

Jain, Anil K., et al., "Soft Biometric Traits for Personal Recognition Systems", Proceedings of International Conference on Biometric Authentication, LNCS 3072, Hong Kong, (Jul. 2004), pp. 731-738.
Snelick, Robert, et al., "Large-Scale Evaluation of Multimodal Biometric Authentication Using State-of-the-Art Systems", IEEE Transactions on Pattern Analysis and Machine Intelligence, vol. 27, No. 3, (Mar. 2005), pp. 450-455.
Suteu, Yagiz, et al., "A Secure Biometric Authentication Scheme Based on Robust Flashing", Proceedings of the 7th Workshop on Multimedia and Security, New York, New York, (Aug. 2005), pp. 111-116.

\* cited by examiner

*Primary Examiner* — Ellen Tran
(74) *Attorney, Agent, or Firm* — Kwan & Olynick LLP

(57) ABSTRACT

User physical interaction characteristics information or the way a user physically interacts with a device is analyzed to aid in authenticating a user of a device. User physical interaction characteristics information such as swipe speed, finger area, finger conductivity, finger angle, device angle, movement patterns, acceleration, etc., provide signatures that are distinctive for particular individuals and possibly unique if measured to a sufficiently high level of precision. In some examples, a device measures finger positions, finger pad sizes, moisture level, acceleration, displacement, and changes in finger pad size for a particular user and compares the measurements to physical interaction characteristics measured during subsequent usage of the device to verify that a user is an authorized user.

20 Claims, 5 Drawing Sheets

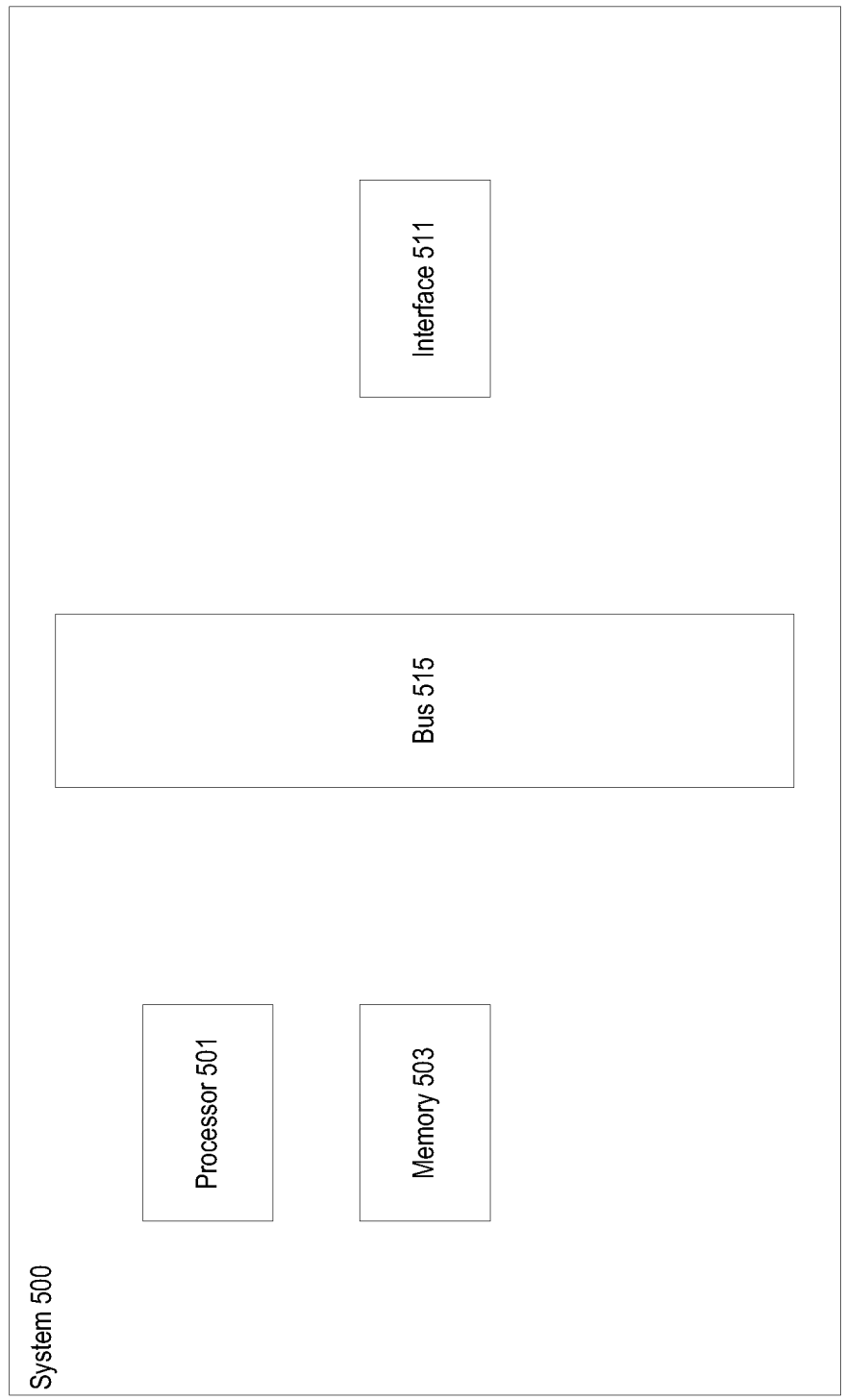

AUTHENTICATION USING PHYSICAL INTERACTION CHARACTERISTICS

TECHNICAL FIELD

The present disclosure relates to authentication using physical interaction characteristics.

DESCRIPTION OF RELATED ART

Many devices such as mobile devices require entry of a passcode such as a password, code sequence, or pin before a user can access the mobile device. The passcodes may be application level, platform/operating system level, or hardware read only memory (ROM) level. In some instances, devices may have a biometric scanner such as a fingerprint reader that will scan a fingerprint in addition to requiring a passcode. Some devices may use a camera to perform facial recognition prior to allowing user access. Still other systems require a password along with correct responses to a particular set of challenge questions.

Although passcode based authentication and available biometric based authentication systems are effective, they have limitations. For example, some biometric based authentication systems are not fully accurate and lead to many false positives and negatives. Passcodes similarly have limitations. Consequently, the techniques of the present invention provide improved mechanisms for authentication.

BRIEF DESCRIPTION OF THE DRAWINGS

The disclosure may best be understood by reference to the following description taken in conjunction with the accompanying drawings, which illustrate particular embodiments of the present invention.

FIG. 5 illustrates a particular example of a computer system.

DESCRIPTION OF PARTICULAR EMBODIMENTS

Figure 1:
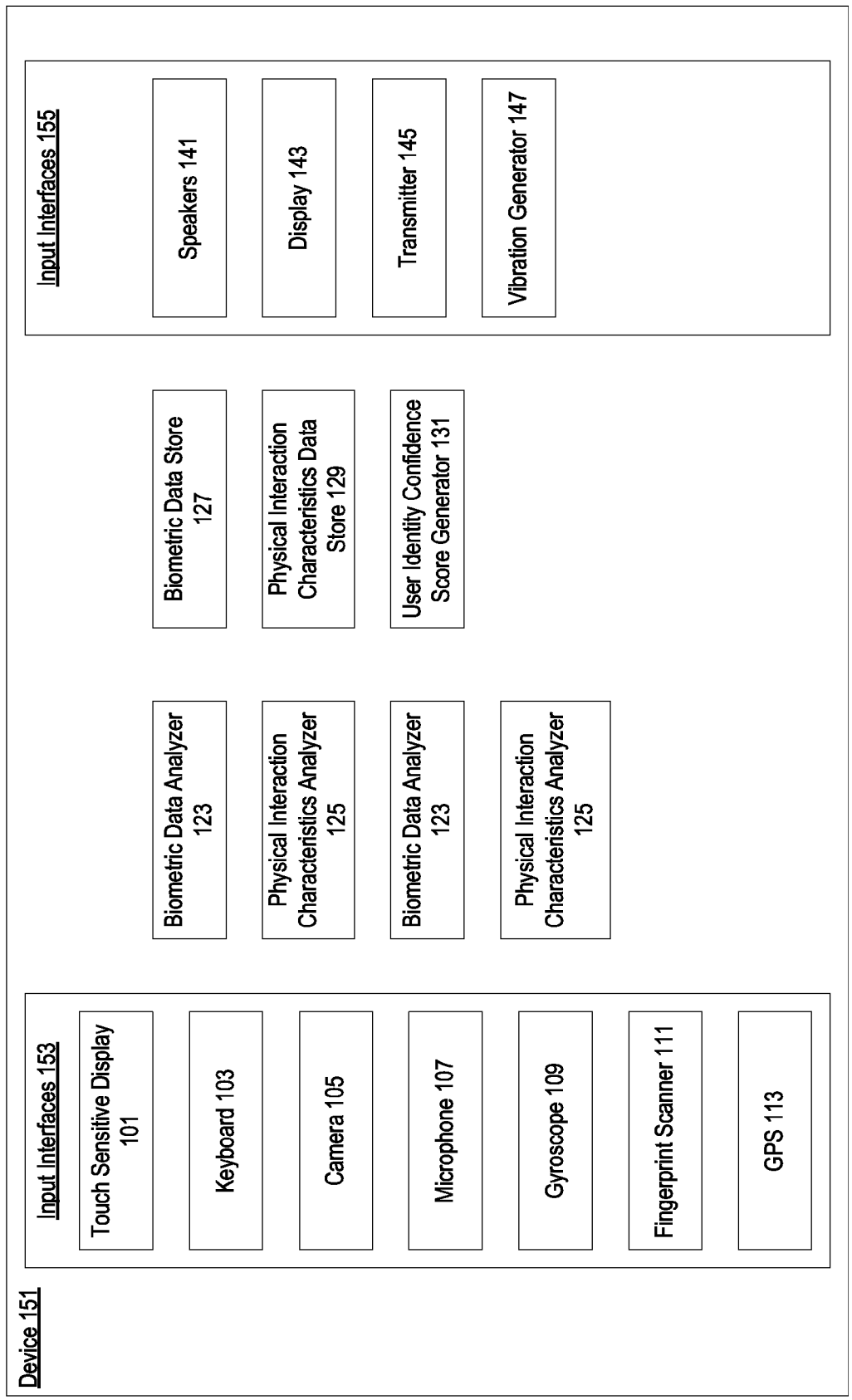
FIG. 1 illustrates a particular system for implementing multilevel passcode authentication.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular platforms and operating systems. However, it should be noted that the techniques and mechanisms of the present invention apply to a variety of different platforms and operating systems. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

User physical interaction characteristics information or the way a user physically interacts with a device is analyzed to aid in authenticating a user of a device. User physical interaction characteristics information such as swipe speed, finger area, finger conductivity, finger angle, device angle, movement patterns, acceleration, etc., provide signatures that are distinctive for particular individuals and possibly unique if measured to a sufficiently high level of precision. In some examples, a device measures finger positions, finger pad sizes, moisture level, acceleration, displacement, and changes in finger pad size for a particular user and compares the measurements to physical interaction characteristics measured during subsequent usage of the device to verify that a user is an authorized user.

Example Embodiments

Devices such as mobile devices use different mechanisms for authenticating a user. In some instances, authentication may be an application password received at a software application level. In other examples, authentication may involve an operating system or framework requesting fingerprint scan data, iris scan data, or facial recognition data before any operating system or framework functionality can be accessed. In still other examples, authentication information such as a password is requested during a boot sequence by a read only memory (ROM). A variety of levels of authentication are used. Some applications may require re-authentication after predetermined inactivity periods. Re-authentication typically includes a request for the same authentication information received previously.

Biometric mechanisms for authentication are effective but limited. In many instances, using biometric authentication alone leads to a number of false positives or negatives. Consequently, biometric authentication is often supplemented with passcode mechanisms. Passcode mechanisms are similarly effective but limited. Entering passcodes can be cumbersome, particularly on mobile devices because of limited input interface mechanisms. Some users will simplify mobile device related passcodes to allow ease of entry.

Consequently, techniques and mechanisms are provided to allow for enhanced authentication of a user without negatively impacting user experience. According to various embodiments, user characteristics such as device physical interaction characteristics are continually evaluated to determine whether the current device physical interaction characteristics correspond to those of an authorized user. User physical interaction characteristics including how the user holds a device when viewing a screen, how the user holds a device when swiping or typing, how quickly the user taps, types, or swipes, how the user moves the device, finger pad area, finger moisture, proximity and number of surfaces near the touchscreen during interaction with the device, etc., can all be used to identify a user with some degree of certainty. If user characteristics information consistently can verify the identity of the user with a high degree of certainty, passcode information and/or biometric information may not be needed. According to various embodiments, user characteristics information includes user physical interaction characteristics information such as tapping and swiping speed, finger width, device viewing angle, etc. User characteristics information may also include time and location information not included in the group of user physical interaction characteristics as used herein.

Time and location information may indicate that a mobile device is used at the same times every morning and email is accessed every two to three hours during the day. Similarly, it may be determined that a user typically operates from particular locations at particular times of day. Operating outside of those particular locations or time periods may indicate that additional authentication is needed. Additional authentication may involve only application level authentication, or may involve operating system level authentication and hardware level authentication as well. In some instances, the device generates a user identity confidence score that indicates how likely the user of a particular device is the owner of the device or an authorized user of the device. In some examples the user identity confidence score may be one or more values that indicate the likelihood a current user is an authorized user.

If the user identity confidence score is low based on available user characteristics information, passcode information may be requested more frequently or additional authentication information on top of passcodes may be requested. According to various embodiments, if the user identity confidence score is high based on user characteristics information, passcode information may not be requested for an extended period of time. In particular embodiments, if the user identity confidence score is sufficiently high, passcode information is not requested for an extended period of time even when a device is resuming from standby or sleep mode.

According to various embodiments, the user identity confidence score provides a graduated scale for determining how frequently passcode information or additional authentication information is requested. Requesting passcode information or biometric information less frequently may improve user experience while maintaining device security. In particular embodiments, if a user identity confidence score is low at a particular point, additional biometric information or additional user characteristics information may be obtained or requested.

FIG. 1 illustrates one particular example of a device that can use multilevel authentication. According to various embodiments, the device 151 may include multiple input interfaces 153 such as touch sensitive display 101, keyboard 103, camera, 105, microphone 107, gyroscope 109, fingerprint scanner 111, global positioning system (GPS) 113, etc. The input interfaces may be used to obtain passcode information such as passwords, pins, and pattern sequences as well as biometric information such as fingerprints, facial pattern scans, and iris scans. According to various embodiments, input interfaces may also be used to obtain user physical interaction characteristics information, such as swipe speed and length, device usage angle, application usage patterns, finger width, etc. In particular embodiments, it is recognized that user physical interaction characteristics such as tapping speed, swipe speed, finger width, device usage angle, hand temperature, and physical interaction characteristics, provide information about who may be using a particular device. Physical interaction characteristics information can be used along with biometric information and passcode information to further authenticate a user.

In particular embodiments, the device also includes a passcode store 121, a biometric data analyzer component 123, a physical interaction characteristics analyzer component 125, a biometric data store 127, and a physical interaction characteristics data store 129. According to various embodiments, the passcode store 121, biometric data store 127, and physical interaction characteristics data store 129 maintain passcodes, biometric data, and physical interaction characteristics data in encrypted form. Newly encrypted data may be compared to previously encrypted data maintained on the device. According to various embodiments, a user identity confidence score generator 131 aggregates scores from the biometric data analyzer component 123 and the physical interaction characteristics analyzer component 125 and identifies when passcode information was last obtained. If passcode information was entered fairly recently and biometric data and physical interaction data is consistent with the identified user, a high identity confidence score is maintained. According to various embodiments, even if significant time has elapsed since passcode information was last entered, as long as biometric data and physical interaction characteristics data is consistent with the identified user, passcode information may not be requested for an extended period of time.

In some examples, if a user identity confidence score is sufficiently high, a device may only request some biometric information instead of requesting user entry of a passcode. According to various embodiments, the device may also include output interfaces 155 such as speakers 141, display 143, transmitter 145, vibration generator 147, etc. The output interfaces can be used to request authentication information from the user.

Figure 2:
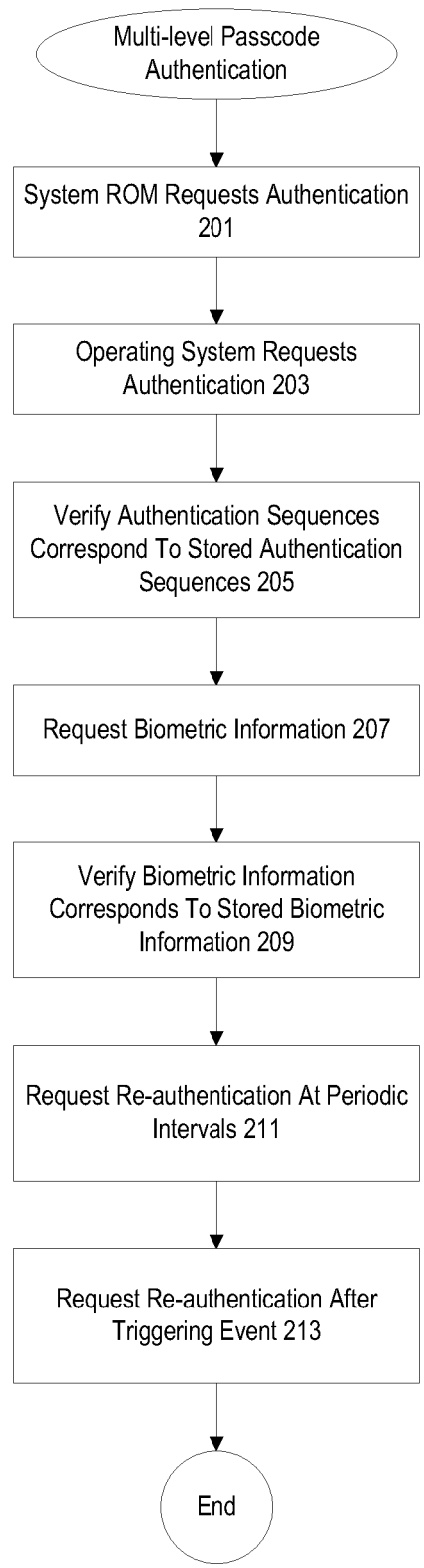
FIG. 2 illustrates a particular example of multilevel passcode authentication.

FIG. 2 illustrates one example of a technique for multilevel passcode authentication. At 201, a system ROM requests user authentication. The system ROM may request user authentication during an initial device boot sequence. According to various embodiments, an operating system requests user authentication including passcodes at 203. The ROM and/or operating system may verify that authentication sequences correspond with stored authentication sequences at 205. Otherwise, the user may not be allowed to proceed. User authentication may include passcodes such as passwords, pins, answers to verification questions, code sequences, etc. The operating system may also request user biometric information at 207. The device may verify that the biometric information corresponds with maintained biometric information at 209. At periodic intervals, the ROM, operating system, or even applications may request re-authentication at 211. According to various embodiments, the ROM, operating system, and applications may also request re-authentication after a particular triggering event at 213. The triggering event may be a device resuming from standby or sleep mode.

Figure 3:
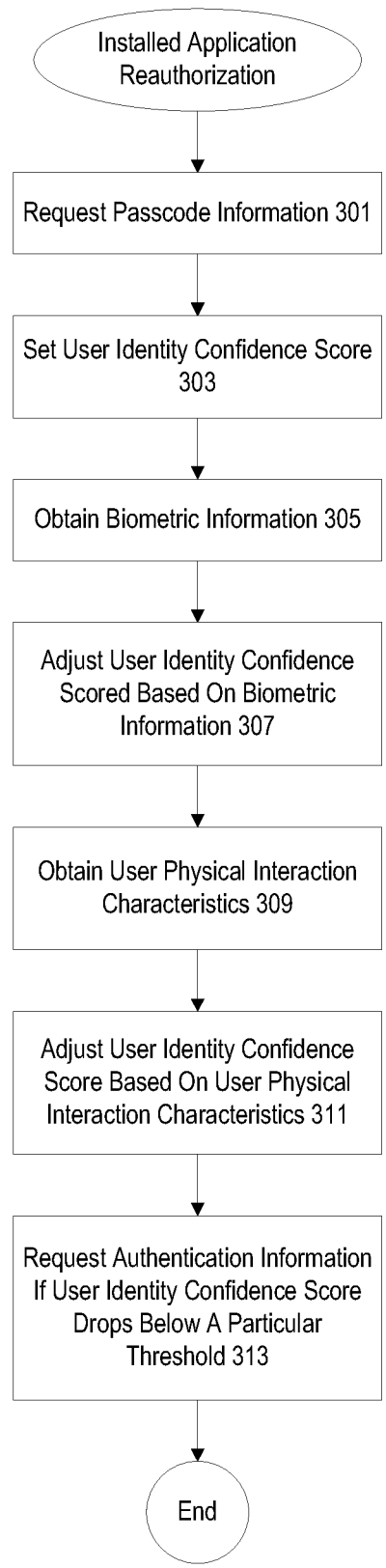
FIG. 3 illustrates a particular example multilevel passcode authentication using a user identity confidence score.

FIG. 3 illustrates one example of a technique for multi-level passcode authentication using a user identity confidence score. According to various embodiments, a system or operating system requests passcode information initially at 301. In particular embodiments, a user identity confidence score is set at 303. According to various embodiments, the user identity confidence score varies based on the strength of the password or errors made in password entry. Biometric information may also be obtained or continuously obtained at 305. Biometric information may raise or lower the identify confidence score at 307. In some instances, the user may not be verifiable based on biometric information, or biometric information may be very limited and not contribute much to maintaining a high user identity confidence score. According to various embodiments, user physical interaction characteristics are obtained or continuously obtained at 309. User physical interaction characteristics may include swipe speed, finger width, angle at which a device is typically held, etc. These physical interaction characteristics provide a signature that can help identify a particular user.

According to various embodiments, the user physical interaction characteristics may raise or lower the user identity confidence score at 311. According to various embodiments, if the user identity confidence score drops to a particular threshold, passcode information is requested or additional authentication information is obtained at 313. In particular embodiments, enter passcode information at this point may involve reentry of the same password or pin, responding to a challenge question, providing additional authentication information, entering a different password, etc. If the user identity confidence score remains sufficiently high or sufficient passcode information is entered, the use is provided access to one or more applications on the device. However, if the user identity confidence score is maintained above a confidence threshold, no additional authentication information may be required. In some examples, additional authentication information may include responses to challenge questions, password information, or pin information. As time passes after the last passcode entry, the user identity confidence score may continue to drop even if biometric information or physical interaction characteristics information is consistent with that of a user.

In other examples, a user may elect to set a device to not have to enter any passcode information unless biometric information or user device physical interaction characteristics are sufficiently incongruent with that of the user that a user identity confidence score drops below a confidence threshold. That is, passcode information and other authentication information such as a response to a challenge question may be requested only if biometric information and user physical interaction characteristics information are insufficient.

Figure 4:
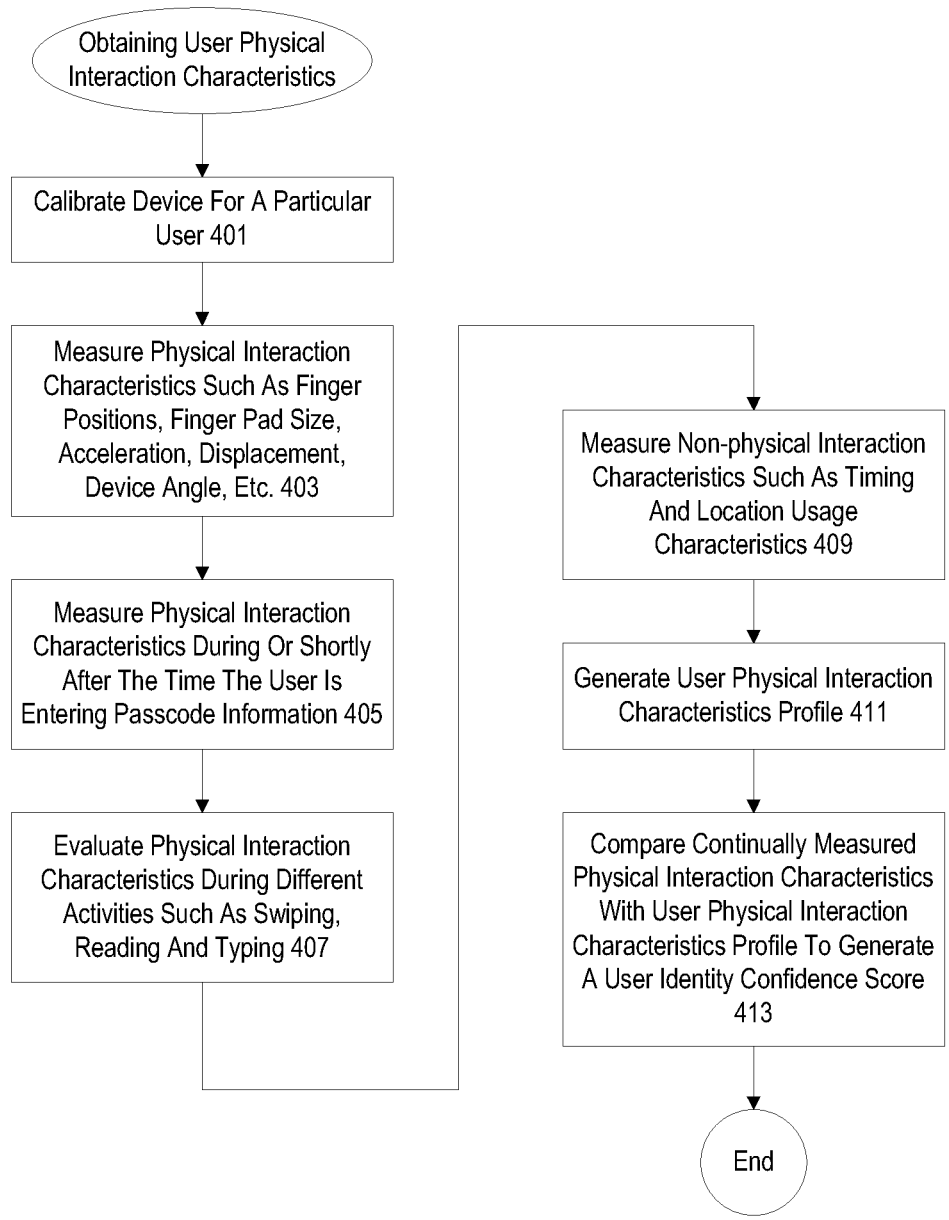
FIG. 4 illustrates a particular example of technique for user physical interaction characteristics identification.

FIG. 4 illustrates one example of a technique for obtaining user physical interaction characteristics. At 401, a device may be calibrated or initialized for the particular user. Capacitive sensors such as those on a touchscreen or touchpad detect any capacitance different from that of air. Capacitive sensors are sensitive to finger positions, finger pad sizes, moisture level, acceleration, displacement, changes in finger pad size during motion, etc. Individual users have fingers and finger motions that are distinctive for that individual, and possibly unique if measured to a sufficiently high level of precision. In particular embodiments, a device measures finger positions, finger pad sizes, moisture level, acceleration, displacement, device angle, changes in finger pad size, etc., during motion while a device is being calibrated for a particular user at 403.

In particular embodiments, these physical interaction characteristics can also be measured while the user is entering a passcode or shortly after a passcode has been entered at 405. According to various embodiments, the angle at which a device is held is also measured during different activities such as swiping, reading, and typing at 407. In particular embodiments, non-physical interaction characteristics such as timing and location usage characteristics such as locations of use and time periods of use are also measured for the particular user at 409. According to various embodiments, physical interaction characteristics information is used to generate a user physical interaction characteristics profile at 411. Aspects of the user physical interaction characteristics profile can be used to evaluate user actions to determine a user identity confidence score at 413. In some examples, a user physical interaction characteristics profile is part of a more general user characteristics profile that may include timing and location usage characteristics as well as user provided data.

A variety of devices and applications can implement particular examples of the present invention. FIG. 5 illustrates one example of a computer system. According to particular example embodiments, a system 500 suitable for implementing particular embodiments of the present invention includes a processor 501, a memory 503, an interface 511, and a bus 515 (e.g., a PCI bus). When acting under the control of appropriate software or firmware, the processor 501 is responsible for such tasks such as optimization. Various specially configured devices can also be used in place of a processor 501 or in addition to processor 501. The complete implementation can also be done in custom hardware. The interface 511 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method for user authentication on a mobile device, the method comprising:
    obtaining physical interaction characteristics information for a user of a device, the physical interaction characteristics information including finger angle, the tilt of the device, and a confidence score based on an interaction, the physical interaction characteristics information being measured as the user utilizes the device;
    maintaining the physical interaction characteristics information for the user of the device;
    generating a user physical interaction characteristics profile;
    continually measuring physical interaction characteristics information as the user utilizes the device; and
    recurrently comparing the continually measured physical interaction characteristics information with the user physical interactions characteristics profile in order to consistently authenticate the user without the need for passcode information or additional authentication information, wherein the additional authentication information includes fingerprints, facial recognition, and iris scans, wherein the confidence score provides a graduated scale for determining how frequently passcode information or additional authentication information is requested.

2. The method of claim 1, wherein the physical interaction characteristics information is compared with the user physical interaction characteristics profile to generate a user identity confidence score.

3. The method of claim 1, wherein physical interaction characteristics information is obtained during or shortly after the time the user enters passcode information.

4. The method of claim 3, wherein physical interaction characteristics information comprises tapping and swiping speed and acceleration.

5. The method of claim 3, wherein physical interaction characteristics information comprises finger pad area.

6. The method of claim 3, wherein physical interaction characteristics information comprises device angle.

7. The method of claim 4, wherein physical interaction characteristics information comprises device angle measured during swiping, reading, and typing.

8. The method of claim 7, wherein non-physical interaction characteristics including location and time information are evaluated to generate the user identity confidence score.

9. The method of claim 8, wherein additional authentication information comprises passcode information and biometric data.

10. The method of claim 1, wherein a sufficiently high user identity confidence score authorizes the user to access an application on the device.

11. A system for user authentication on a mobile device, the system comprising:
    a plurality of input interfaces configured to obtain physical interaction characteristics information for a user of a device, the physical interaction characteristics information including finger angle, the tilt of the device, and a confidence score based on an interaction, the physical interaction characteristics information being measured as the user utilizes the device;
    storage configured to maintain the physical interaction characteristics information for the user of the device;
    a physical interaction characteristics analyzer configured to generate a user physical interaction characteristics profile;
    a processor configured to continually measure physical interaction characteristics information, using the plurality of input interfaces, as the user utilizes the device; and
    a user identity confidence score generator configured to recurrently compare the continually measured physical interaction characteristics information with the user physical interactions characteristics profile in order to consistently authenticate the user without the need for passcode information or additional authentication information, wherein the additional authentication information includes fingerprints, facial recognition, and iris scans, wherein the confidence score provides a graduated scale for determining how frequently passcode information or additional authentication information is requested.

12. The method of claim 11, wherein the physical interaction characteristics information is compared with the user physical interaction characteristics profile to generate a user identity confidence score.

13. The system of claim 11, wherein physical interaction characteristics information is obtained during or shortly after the time the user enters passcode information.

14. The system of claim 13, wherein physical interaction characteristics information comprises tapping and swiping speed and acceleration.

15. The system of claim 13, wherein physical interaction characteristics information comprises finger pad area.

16. The system of claim 13, wherein physical interaction characteristics information comprises device angle.

17. The system of claim 14, wherein physical interaction characteristics information comprises device angle measured during swiping, reading, and typing.

18. The system of claim 17, wherein non-physical interaction characteristics including location and time information are evaluated to generate the user identity confidence score.

19. The system of claim 18, wherein additional authentication information comprises passcode information and biometric data.

20. A non-transitory computer readable storage medium comprising computer code for performing user authentication on a mobile device, the computer code comprising:
    computer code for obtaining physical interaction characteristics information for a user of a device, the physical interaction characteristics information including finger angle, the tilt of the device, and a confidence score based on an interaction, the physical interaction characteristics information being measured as the user utilizes the device;
    computer code for maintaining the physical interaction characteristics information for the user of the device;
    computer code for generating a user physical interaction characteristics profile;

computer code for continually measuring physical interaction characteristics information as the user utilizes the device; and computer code for recurrently comparing the continually measured physical interaction characteristics information with the user physical interactions characteristics profile in order to consistently authenticate the user without the need for passcode information or additional authentication information, wherein the additional authentication information includes fingerprints, facial recognition, and iris scans, wherein the confidence score provides a graduated scale for determining how frequently passcode information or additional authentication information is requested.

* * * * *